United States Patent [19]
Matsui

[11] Patent Number: 5,901,120
[45] Date of Patent: May 4, 1999

[54] OPTICAL DISC APPARATUS WITH SENSING CIRCUITRY TO JUDGE A MOVEMENT DIRECTION OF A BEAM SPOT

[75] Inventor: Tsutomu Matsui, Tokyo, Japan

[73] Assignee: NEC Corporation, Tokyo, Japan

[21] Appl. No.: 08/844,723

[22] Filed: Apr. 18, 1997

[51] Int. Cl.⁶ ........................................................ G11B 7/00
[52] U.S. Cl. .................................. 369/44.28; 369/44.34; 369/44.41
[58] Field of Search ........................... 369/44.28, 44.41, 369/44.42, 44.34, 44.29, 54

[56] References Cited

U.S. PATENT DOCUMENTS

| | | | |
|---|---|---|---|
| 4,866,687 | 9/1989 | Kasai et al. ................................ | 369/32 |
| 4,974,220 | 11/1990 | Harada .................................. | 369/44.28 |
| 5,249,213 | 9/1993 | Kobunayn .............................. | 369/44.34 |
| 5,311,490 | 5/1994 | Matoba et al. ........................ | 369/44.28 |

*Primary Examiner*—Thang V. Tran
*Attorney, Agent, or Firm*—Whitham, Curtis & Whitham

[57] ABSTRACT

An optical disc apparatus which records and reproduces an information signal from an optical disc having land and groove tracks, whose width ratio being set to be 1 or to be a value close thereto, is capable of detecting a moving direction of a beam spot in a random access mode, by applying a four-division or six-division optical sensor, segmented by division lines tilted by 45°±25° from the track tangential direction, wherein two output signals having a phase difference of about 90° are produced and the moving direction is detected.

4 Claims, 8 Drawing Sheets

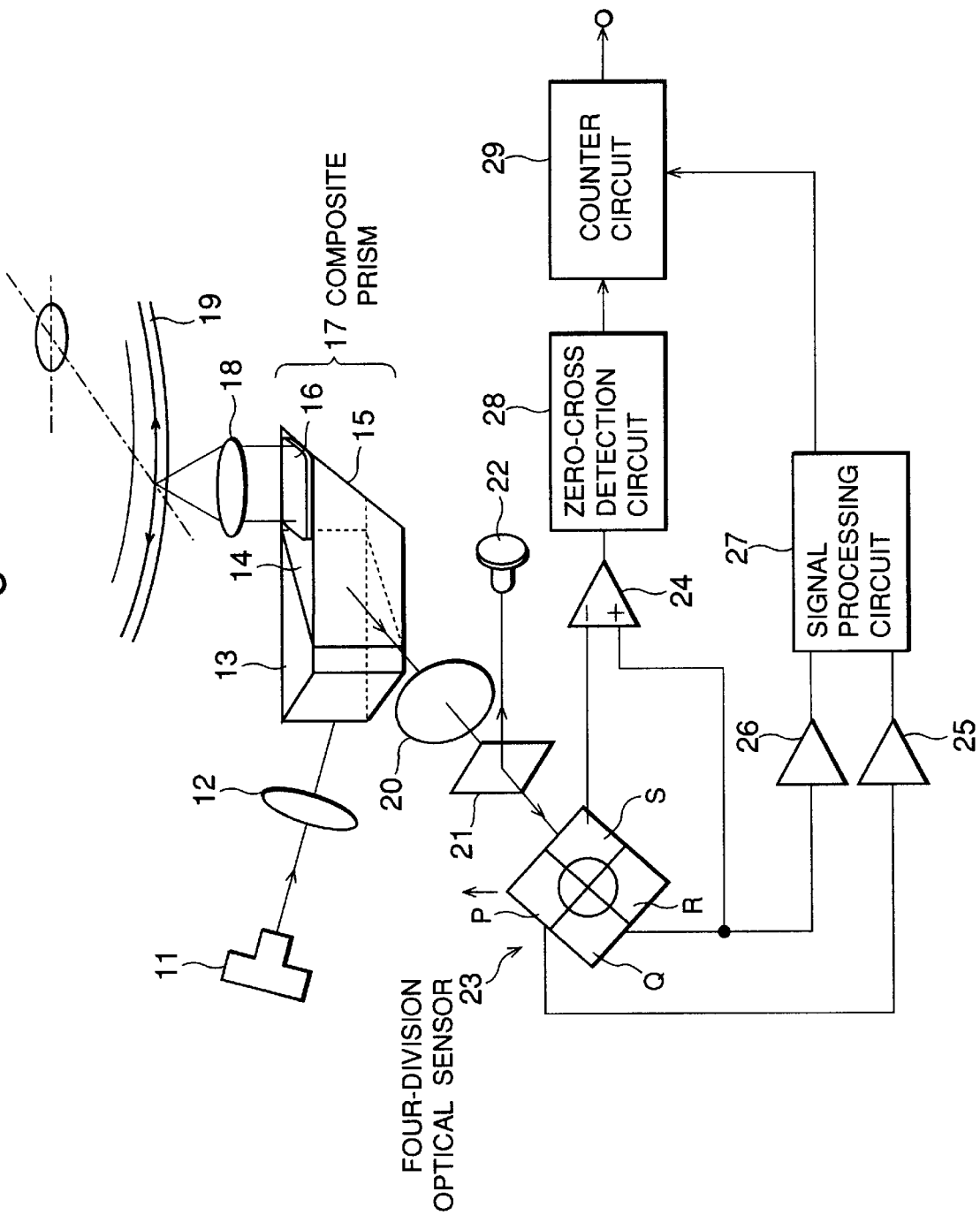

OPTICAL DISC APPARATUS WITH SENSING CIRCUITRY TO JUDGE A MOVEMENT DIRECTION OF A BEAM SPOT

BACKGROUND OF THE INVENTION

1. Field of the Invention

The present invention relates to optical disc apparatuses and more particularly, to an optical disc apparatus which, when an optical disc is subjected to a random access operation to record/reproduce an information signal to/from a land/groove track on the optical disc, performs counting operation of the number of tracks and also performs discriminating operation between inner and outer peripheries of the optical disc.

2. Description of the Related Art

There has been rapidly studied and developed an external storage which has both of the high-speed accessibility of a magnetic disc for computer use and the large memory capacity of an optical disc. Optical disc apparatuses will be positively destined to lead the next generation.

FIG. 7 shows an exemplary arrangement of a paior art optical disc apparatus which includes a laser light source 51, a collimator lens 52, a composite prism 57, an objective lens 58, a convex lens 60, a beam splitter 61, an RF optical sensor 62, a two-division optical sensor 63, and amplifiers 64 and 65. The composite prism 57 has a wedge part 53, a polarization beam splitter part 54, a 45-degree mirror part 55, and a ¼ wavelength plate 56.

Explanation will be made as to the operation of the above optical disc apparatus. A light beam emitted from the laser light source 51 is collimated by the collimator lens 52; then passed through the wedge part 53, polarization beam splitter part 54, 45-degree mirror part 55 and ¼ wavelength plate 56 in this order; and then directed to the objective lens 58 to be focused on an optical disc 59. The light beam reflected by the optical disc 59 goes back to the ¼ wavelength plate 56, where the reflected light beam is subjected to a circular polarization of rotation of a direction opposite to the incident light beam to the optical disc 59 to be converted to a linear polarization beam perpendicular to the incident beam, reflected by the 45-degree mirror part 55, and then directed into the polarization beam splitter part 54.

The incident light beam is called S wave for the polarization beam splitter part 54, where the incident light beam is deflected by an angle of 90 degrees, focused by the convex lens 60, partly reflected by the beam splitter 61, and then directed to the RF optical sensor 62; whereas, the remaining light beam is passed through the beam splitter 61, and then received by the two-division optical sensor 63 whose division line is parallel to a track tangential direction of the optical disc 59, so that the two-division optical sensor 63 generates a tracking error signal based on a so-called push-pull method. The RF optical sensor 62 detects an RF signal on the basis of 90-degree deflected light wave. Two electric signals delivered from two sensing elements A and B in the two-division optical sensor 63 are amplified by the amplifiers 64 and 65, and then output therefrom as output signals $T_A$ and $T_B$.

FIGS. 8(A), 8(B), 8(C) and 8(D) show a relation between tracks of the optical disc 59 and a beam for explaining a way for counting tracks in a prior art land/groove optical disc. In detail, FIG. 8(A) shows a cross-sectional view of a part of the optical disc 59, in which L denotes a land and G denotes a groove. FIG. 8(B) shows a configuration of the beam focused on the land (L)/groove (G) with respect to the two sensing elements A and B of the two-element optical sensor 63. That is, the two-element optical sensor 63 is positioned so that the division line of the two-division optical sensor 63 is parallel to the track tangential direction 70 of the optical disc 59.

In FIG. 8(B), a white part 71 denotes the land (L) on the optical disc 59 and a hatched part 72 denotes the groove (G) on the optical disc 59. It is assumed in the drawing that the output signals $T_A$ and $T_B$ from the two sensing elements A and B in the two-division optical sensor 63 are arranged so that, for convenience of explanation, the output levels thereof are made large when the focused beam comes to the land part while are made small when the beam comes to the groove part. Then, in FIG. 8(B), when the focused beam moves transversely across the tracks toward a rightward direction in a random access mode, the output signal $T_A$ from one sensing element A is as shown by 73 in FIG. 8(C), while the output signal $T_B$ from the other sensing element B is shown by 74 in FIG. 8(D).

In the random access mode of the optical disc apparatus, a tracking error signal generated based on the output signals $T_A$ and $T_B$ varies whenever the light beam transverses each track. Thus, the optical disc apparatus, by counting the tracking error signal, can judge the number of tracks to reach on a target track and an optical head therein can move the focused light beam to the target track at a high speed.

According to the prior art optical disc apparatus mentioned above, when a width ratio of the optical disc between the land and groove is set to be 1:1 or to be a value close thereto for high density recording with respect to a disc radial direction and when the tracking error signal is detected by the two-division optical sensor 63, the two output signals $T_A$ and $T_B$ from the two sensing elements become to have a phase difference of about 180 degrees as shown by 73 and 74 in FIG. 8(C) and 8(D) in the random access mode. For the sake of the phase relationship, the prior art optical disc apparatus has a problem that the apparatus cannot judge on the basis of such a resultant tracking error signal whether the focused beam is moving toward the inner peripheral side of the optical disc or toward the outer peripheral side thereof, which results in that, even when the apparatus counts the tracking error signal, the apparatus cannot judge a distance to the target track.

SUMMARY OF THE INVENTION

It is therefore an object of the present invention to provide an optical disc apparatus which, when randomly accessing an optical disc having land and groove whose widths are substantially equal, can easily judge a movement direction of a beam spot of a focused light beam.

In accordance with the present invention, there is provided an optical disc apparatus for recording and reproducing an information signal to and from both of land and groove on an optical disc, which comprises a four-division optical sensor for receiving a reflected light beam from the optical disc, the optical sensor being divided into four sensing elements by two division lines which are positioned as tilted by an angle in a range of 45±25 degrees with respect to a track tangential direction of the optical disc, first and second sensing elements being positioned parallel to the track tangential direction and third and fourth sensing elements being positioned along a direction perpendicular to the track tangential direction; tracking error signal generating means for generating a tracking error signal indicative of a difference between photoelectrically-converted output signals from the third and fourth light sensing elements; a signal processing circuit for generating a signal for judgement of a movement direction of a beam spot on the optical disc in a random access mode on the basis of a phase difference between a first photoelectrically converted output signal from one of the first and second sensing elements and a second photoelectrically-converted output signal from one of the third and fourth sensing elements; and count means for counting a zero-cross detection signal produced from the tracking error signal in a count direction designated by the movement direction judgement signal.

In accordance with another aspect of the present invention, there is provided an optical disc apparatus which comprises a six-division optical sensor having six sensing elements, the six sensing elements being made up by dividing the sensor by three dividing lines, the two dividing lines being arranged as tilted by an angle in a range of 45±25 degrees with respect to a track tangential direction of the optical disc and one division line being arranged parallel to the track tangential direction; tracking error signal generating means for generating as a tracking error signal a difference signal indicative of a difference between a sum signal of output signals from the three sensing elements and a sum signal of output signals of the other three sensing elements, respectively divided by the division line arranged parallel to the track tangential direction; a signal processing circuit for generating a signal for judgement of a movement direction of a beam spot on the optical disc in a random access mode, on the basis of a phase difference between a sum signal of photoelectrically-converted output signals from two sensing elements arranged at an upper side and a photoelectrically-converted output signal from one sensing element adjacent to the two sensing elements; and count means for counting a zero-cross detection signal of the tracking error signal in a count direction based on the movement direction judgement signal.

In the present invention, the four- or six-division optical sensor is used such that, in the random access mode, the output signals having a phase difference of other than 180 degrees, e.g., of about 90 degrees, are produced. Therefore, the optical disc apparatus, on the basis of the phase difference, can generate the signal for judgement of the moving direction of the light beam spot on the optical disc.

BRIEF DESCRIPTION OF THE DRAWINGS

The above and other objects, features and advantages of the present invention will become apparent from the following detailed description when taken with the accompanying drawings in which:

FIG. 1 shows an arrangement of an optical disc apparatus of an embodiment according to the present invention;

DESCRIPTION OF THE PREFERRED EMBODIMENTS

Figure 2A:
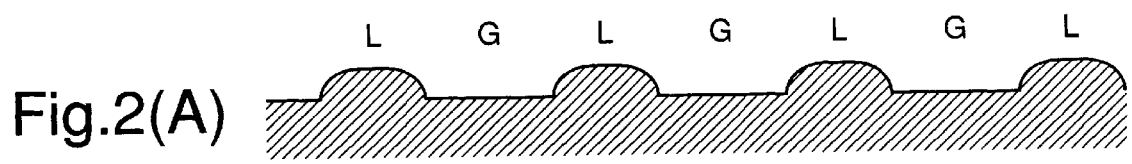
FIGS. 2(A), 2(B), 2(C) and 2(D) show relationships between tracks of land/groove on an optical disc and a light beam spot with output signals from an optical sensor, for explaining a way of counting tracks on the optical disc in the embodiment of FIG. 1.

Referring first to FIG. 1 showing an embodiment of the present invention, an optical disc apparatus comprises a laser light source 11, a collimator lens 12, a composite prism 17, an objective lens 18, a convex lens 20, a beam splitter 21, an RF optical sensor 22, a four-division optical sensor 23, and amplifiers 24 to 27. The composite prism 17 also includes a wedge part 13, a polarization beam splitter part 14, a 45-degree mirror part 15, and a ¼ wavelength plate 16.

In FIG. 1, a light beam emitted from the laser light source 11 is collimated by the collimator lens 12; passed through the wedge part 13, polarization beam splitter part 14, 45-degree mirror part 15 and ¼ wavelength plate 16 in this order; and then directed onto the objective lens 18 to be focused on an optical disc 19. A light beam reflected by the optical disc 19 goes back to the ¼ wavelength plate 16, where the reflected light beam is of a circular polarization type having an opposite rotation direction to the incident light beam to the optical disc 19 and is converted to a linear polarization beam perpendicular to the incident light beam. Then, the reflected light beam is further reflected by the 45-degree mirror part 15, and directed into the polarization beam splitter part 14 to be deflected by an angle of 90 degrees.

The reflected light beam from the polarization beam splitter part 14 is collected by the convex lens 20 and, after this, partly reflected by the beam splitter 21 to be supplied to the RF optical sensor 22; whereas, the remaining light beam passed through the beam splitter 21 is supplied to the four-division optical sensor 23 whose division line is tilted by an angle of 45 degrees with respect to a track tangential direction of the optical disc 19 and which generates a tracking error signal. The RF optical sensor 22 detects the RF signal based on the 90-degree deflected light beam.

The four-division optical sensor 23 has 4 light sensing elements P, Q, R and S. Two output signals photoelectrically converted by the sensing elements Q and S are differentially amplified by the differential amplifier 24 and then supplied to a zero-cross detection circuit 28; whereas, the other output signals from the sensing elements P and Q are amplified by the amplifiers 25 and 26 and then applied to a signal processing circuit 27.

FIG. 2 shows a relationship between tracks of the optical disc 19 and a beam spot with the output signals from the optical sensor for explaining operation for counting the number of tracks on land/groove on the optical disc in FIG. 1. FIG. 2(A) is a cross-sectional view of a part of the optical disc 19, in which L denotes a land and G denotes a groove. The optical disc 19 per se is similar to the optical disc 59 in the prior art. A width ratio between the land L and groove G of the optical disc 19 is set to be 1:1 or to be a value close thereto. Information signals are recorded and reproduced to or from both of the lands L and grooves G.

Figure 2B:
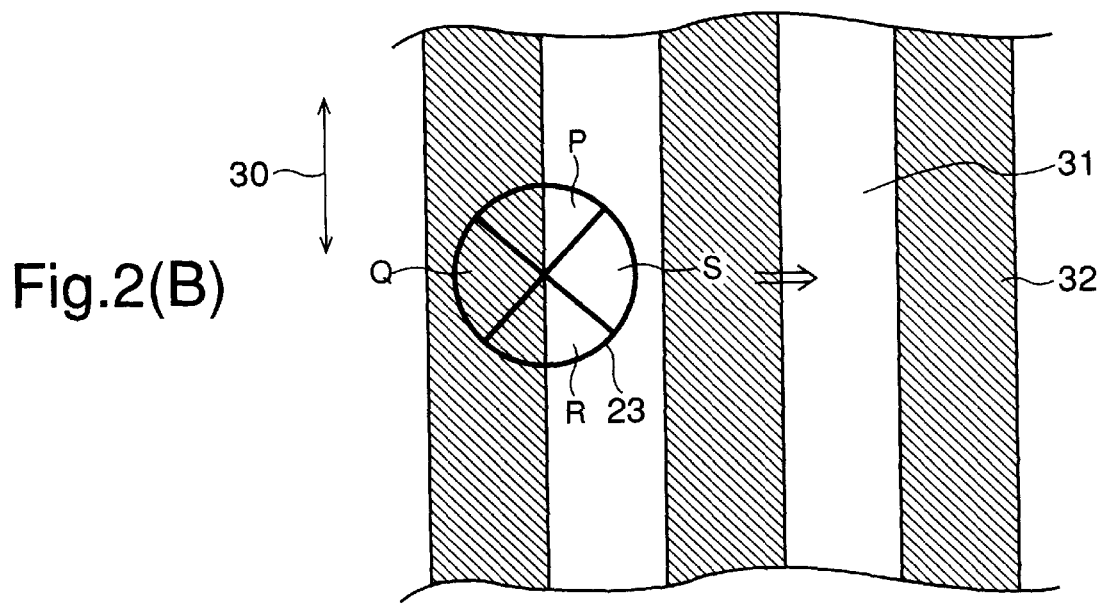
Figure 2C:
Figure 2D:

FIG. 2(B) shows a positional relationship of the beam spot focused on the land (L)/groove (G) optical disc relative to the sensing elements P, Q, R and S of the four-division optical sensor 23. That is, the four-division optical sensor 23 is positioned so that the division lines of the sensor 23 are tilted by an angle of 45 degrees with respect to a track tangential direction 30 of the optical disc 19. Here, a white part 31 denotes the land (L) on the optical disc 19 and a hatched part 32 denotes the group (G) on the optical disc 19. It is assumed in the drawing that the output signals from the four sensing elements P, Q, R and S of the four-division optical sensor 23 are arranged so that, for convenience of explanation, the output signals thereof are made large when the focused beam comes to the land part while are made small when the beam comes to the groove part. Then, when the focused beam moves transversely across the tracks toward a rightward direction in a random access mode in (B), an output signal $T_P$ from the sensing element P is as shown by 33 in (C), while an output signal $T_Q$ from the sensing element Q is as shown by 34 in (D). As shown in (C) and (D), the output signals from the sensing elements P and Q have a phase difference of about 90 degrees therebetween.

In the present embodiment, a track count signal TC and a tracking error signal TE satisfy equations which follow.

$$TC=(P, Q)$$

$$TE=Q-S$$

More in detail, the track count signal TC is obtained through a signal processing at a signal processing circuit 27, (to be described later) by the usage of the output signals from the sensing elements P and Q. The track count signal has information about a moving direction, that is, the inner or outer peripheral direction of the optical disc. The tracking error signal TE is a signal corresponding to a difference between the output signals from the sensing elements P and Q, and this signal is obtained from the amplifier 24 in FIG. 1.

Next, the signal processing circuit 27 for generation of the aforementioned track count signal TC will be described hereinafter with reference to FIGS. 1 and 2 and also to a timing chart shown in FIG. 3(A). According to the prior art shown in FIG. 8, since the output signals from the sensing elements for track count have a phase difference of 180 degrees, it is difficult for the optical disc apparatus to judge whether a beam spot movement direction is the inner or outer peripheral direction of the optical disc. To the contrary, according to the present invention, since the output signals from the sensing elements P and Q for track count have a phase difference of an angle close to 90 degrees, it becomes possible for the optical disc apparatus to judge the beam spot movement direction to be the inner or outer peripheral direction of the optical disc as shown in FIG. 3(A).

Figure 3A:
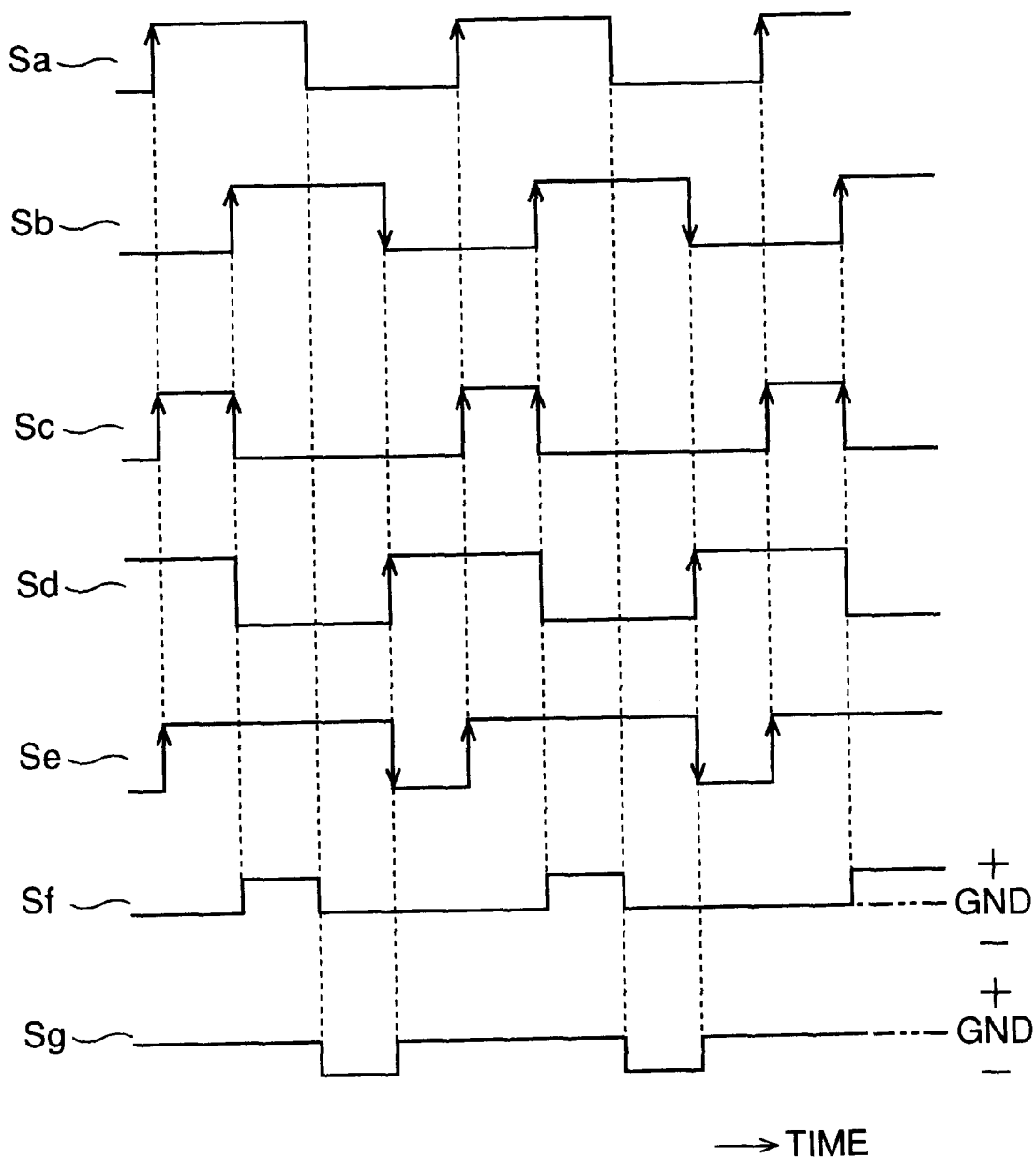
FIG. 3(A) is a timing chart for explaining the operation of the embodiment shown in FIG. 1.

In FIG. 1, more specifically, the output signal from the sensing element P positioned in a direction parallel to the track tangential direction of the optical disc 19 and the output signal from the sensing element Q adjacent to the sensing element P are processed to become an AC type while removing DC components, and then shaped by the amplifiers 25 and 26 having a large amplification factor into such first and second rectangular wave signals $S_a$ and $S_b$ as shown in FIG. 3(A). After this, these shaped rectangular signals $S_a$ and $S_b$ are applied to data input and clock terminals of a D type flip-flop within the signal processing circuit 27 to trigger the flip-flop at their rising edge and to thereby generate therein such a third rectangular wave signal $S_c$ as shown in FIG. 3(A). As will be seen from the signals $S_a$, $S_b$ and $S_c$, the third rectangular wave signal $S_c$ has a pulse width between each rising edge of the first rectangular wave signal $S_a$ and each rising edge of the second rectangular wave signal $S_b$.

Meanwhile, a rectangular wave signal obtained based on the output signal of the sensing element Q is a fourth rectangular wave signal $S_d$ as shown by FIG. 3(A), corresponding to a phase inversion of the second rectangular wave signal $S_b$. To this end, the signal processing circuit 27 performs phase inverting operation for example. A flip-flop, which acts to alternately invert its output at the rising edge of the fourth rectangular wave signal $S_d$ and at the rising edge of the first rectangular wave signal $S_a$, generates such a fifth rectangular wave signal $S_e$ as shown in FIG. 3(A). It will be seen from the signals $S_a$, $S_b$ and $S_e$ that the fifth rectangular wave signal $S_e$ has a pulse width between each rising edge of the first rectangular wave signal $S_a$ and each falling edge of the second rectangular wave signal $S_b$.

In the rectangular wave signals generated in the aforementioned manner, the third rectangular wave signal $S_c$ is subtracted by a differential amplifier from the first rectangular wave signal $S_a$ obtained based on the signal from the sensing element P to generate a first output signal $S_f$ as shown in FIG. 3(A). Further, the fifth rectangular wave signal $S_e$ is subtracted by a differential amplifier from the first rectangular wave signal $S_a$ obtained based on the signal of the sensing element P to generate a second output signal $S_g$ as shown in FIG. 3(A).

The first output signal $S_f$ is at a high (H) level for a period during which the beam spot is present on a part of the land L, whereas, the second output signal $S_g$ is at a low (L) level when the beam spot is shifted from the land L to the groove G. In the example of FIG. 3(A), therefore, when the beam spot stands still at such a position as shown in FIG. 2(B), the disc alternately changes in the order from the land L to the groove G in the random access mode. Accordingly, the optical disc apparatus can judge that the beam spot is seemingly moving from the left to the right in FIG. 2(B). In other words, the movement direction can be judged on the basis of the two output signals $S_f$ and $S_g$.

The signal processing circuit 27 judges a phase lead/lag relationship between the two output signals $S_f$ and $S_g$, controls the discrimination signal of H or L level, and supplies it to a count circuit 29 of FIG. 1 as a count direction control signal. As a result, the count circuit 29 receives an output signal from the zero-cross detection circuit 28 and counts the signal in the count direction based on the above count direction control signal. For example, when the beam spot moves to the inner peripheral direction, the count circuit 29 counts up and, otherwise, counts down.

In the random access mode, in this way, the optical disc apparatus judges the movement direction of the beam spot on the optical disc 19 on the basis of the two output signals $S_f$ and $S_g$, and the tracking error signal varies each time the spot crosses each track. Therefore, the apparatus can identify the number of crossed tracks by counting the zero-cross detection signal of the tracking error signal TE, and can accurately know.. a distance (the number of tracks) up to a target track.

Figure 3B:
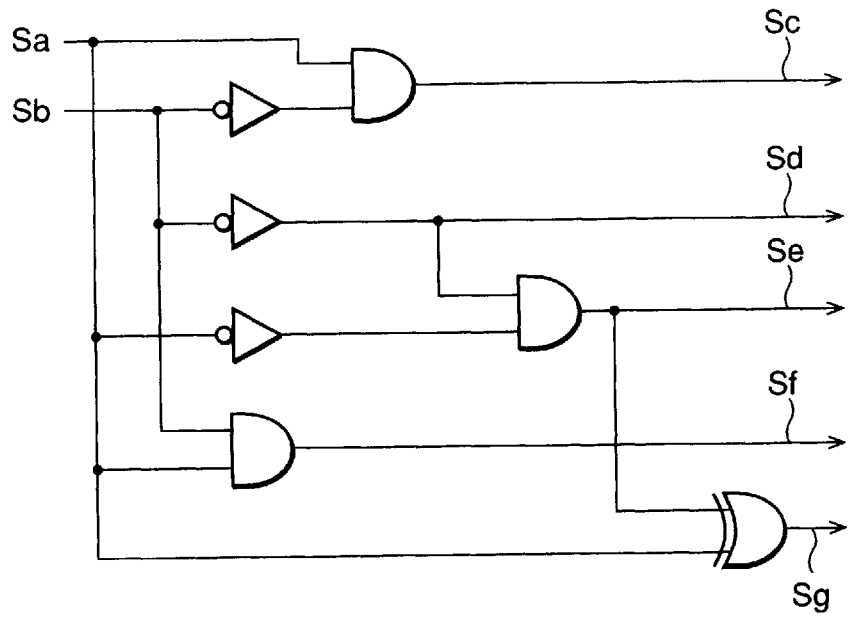
FIGS. 3(B) and 3(C) show examples of a circuit diagrams for generating a count direction signal.
Figure 3C:
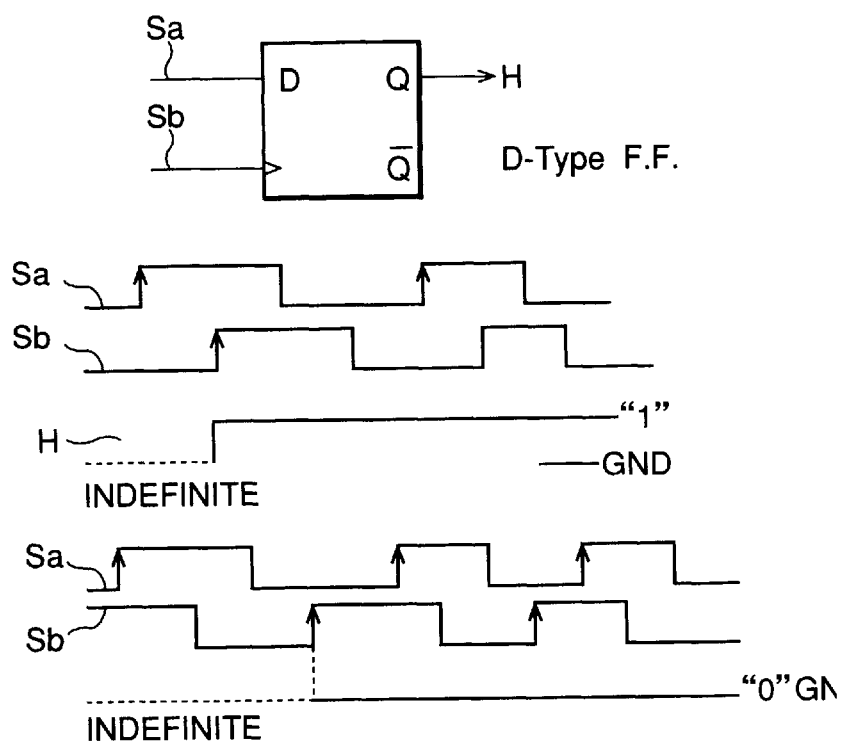

FIG. 3(B) shows a circuit diagram for producing the aforementioned output signals $S_f$ and $S_g$ shown in FIG. 3(A). Further, as shown in FIG. 3(C), the count direction signal H is easily obtained by applying the first and second rectangular wave signals $S_a$ and $S_b$ of FIG. 3(A) to a D-type flip-flop.

Figure 4:
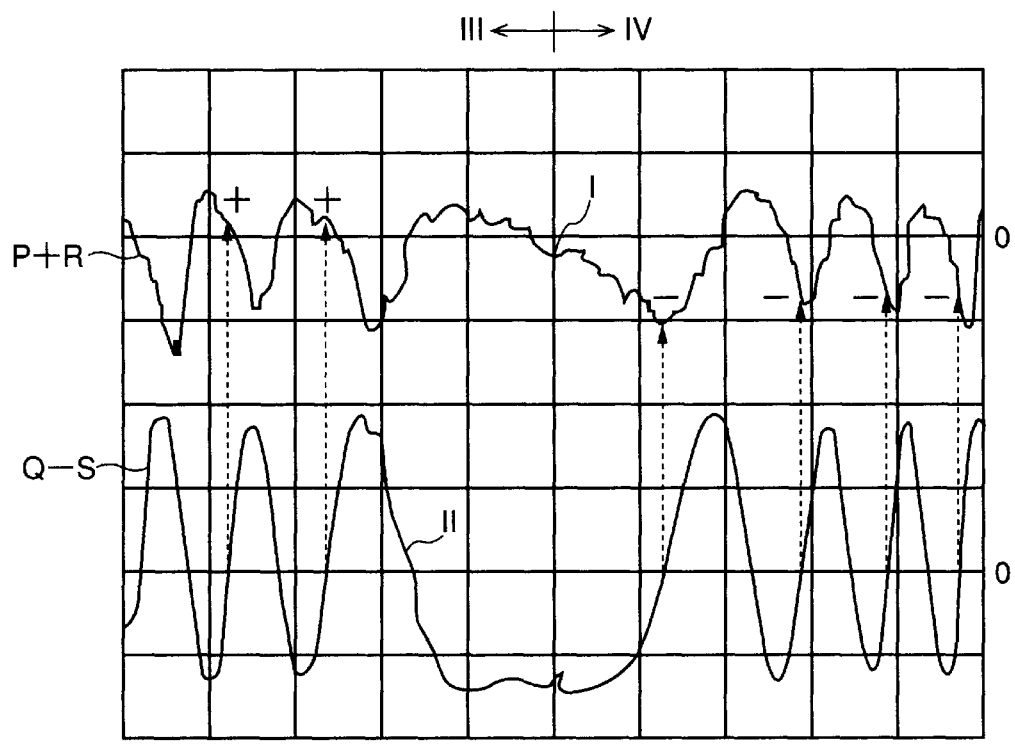
FIG. 4 shows a relationship between a sum signal and a tracking error signal based on the output signals of each 2 of light receiving parts of a four division optical sensor.

By the way, when the optical disc apparatus is not in a tracking servo operation, a sum signal (P+Q) indicative of a sum of the output signals of the sensing elements P and R in the four division optical sensor 23 is as shown by symbol I in FIG. 4, and a tracking error signal (Q-S) is as shown by symbol II in FIG. 4. Further, when the sum signal (P+R) is sampled at zero-cross points in rising parts of the tracking error signal (Q-S), positive sampled values are obtained in a zero III corresponding to the left half of FIG. 4, whereas, negative sampled values are obtained in a zone IV corresponding to the right half thereof, as shown by arrows in FIG. 4.

In the case where tracking servo is pulled in at the zero-cross points of the tracking error signal, it is appreciated from the characteristics of FIG. 4 the followings. The tracking is applied to the land where the tracking servo is applied at the zero-cross point of the rising part of the tracking error signal (Q–S) in the zero III, otherwise, the tracking is applied to the groove where the tracking servo is applied to the zero-cross point of the rising part of the tracking error signal (Q–S) in the zone IV. Thus, it becomes possible to judge the moving direction of the beam spot on the optical disc on the basis of the polarity of the sampled sum signal (P+R) at the zero-cross point in the rising part of the tracking error signal in the random access mode.

Figure 5:
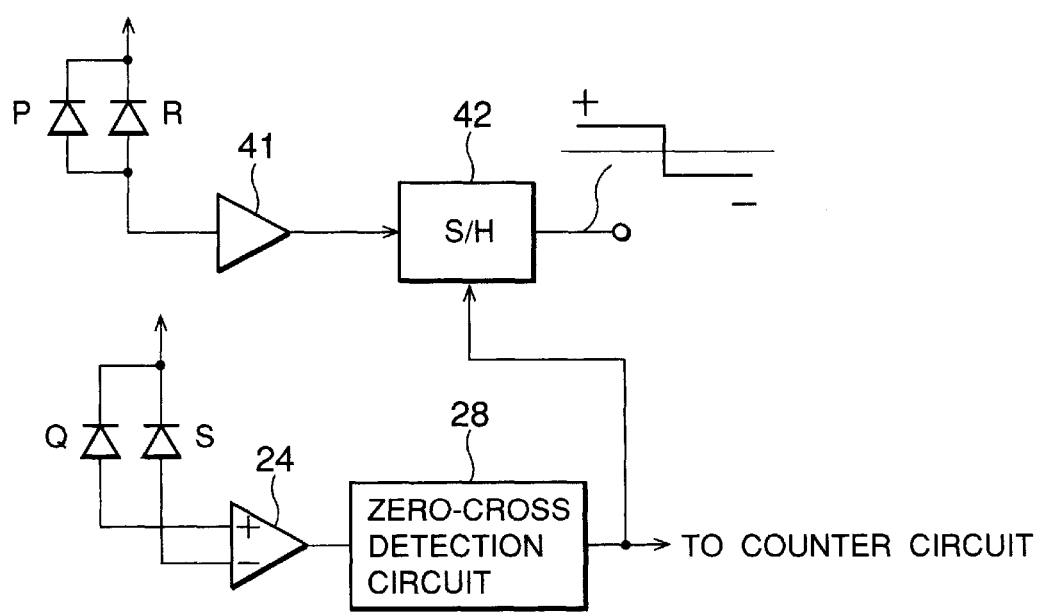
FIG. 5 is a circuit diagram of a major part of another embodiment of the present invention.

Shown in FIG. 5 is a block diagram of an example of a circuit for generating a discrimination signal of the moving direction of the beam spot on the optical disc according to the above embodiment. In FIG. 5, parts having the same structures as those in FIG. 1 are denoted by the same reference numerals or symbols and explanation thereof is omitted. In this figure, output signals obtained from the sensing elements P and R are added and amplified by an amplifier 41 and subsequently supplied to a sample/hold (S/H) circuit 42.

As a sampling pulse, the S/H circuit 42 receives from the zero-cross detection circuit 28 a detection signal generated at the zero-cross point in the rising part of the tracking error signal. The S/H circuit 42 samples the sum signal (P+R) at the sampling pulse and outputs a beam spot moving direction judgement signal to a count circuit (not shown) as a count direction control signal.

Figure 6:
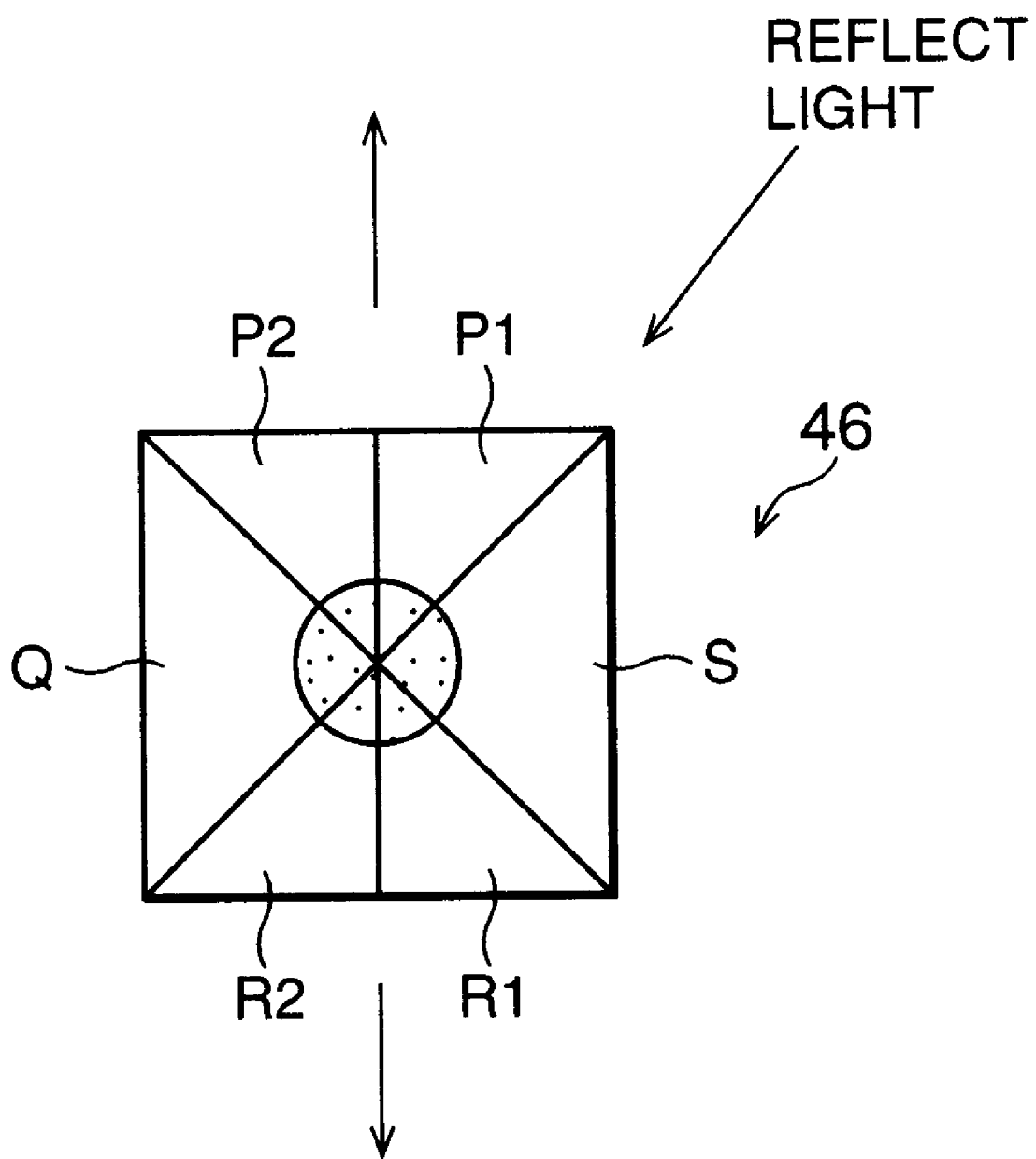
FIG. 6 shows a six-division optical sensor used in the other embodiment of the present invention.
Figure 7:
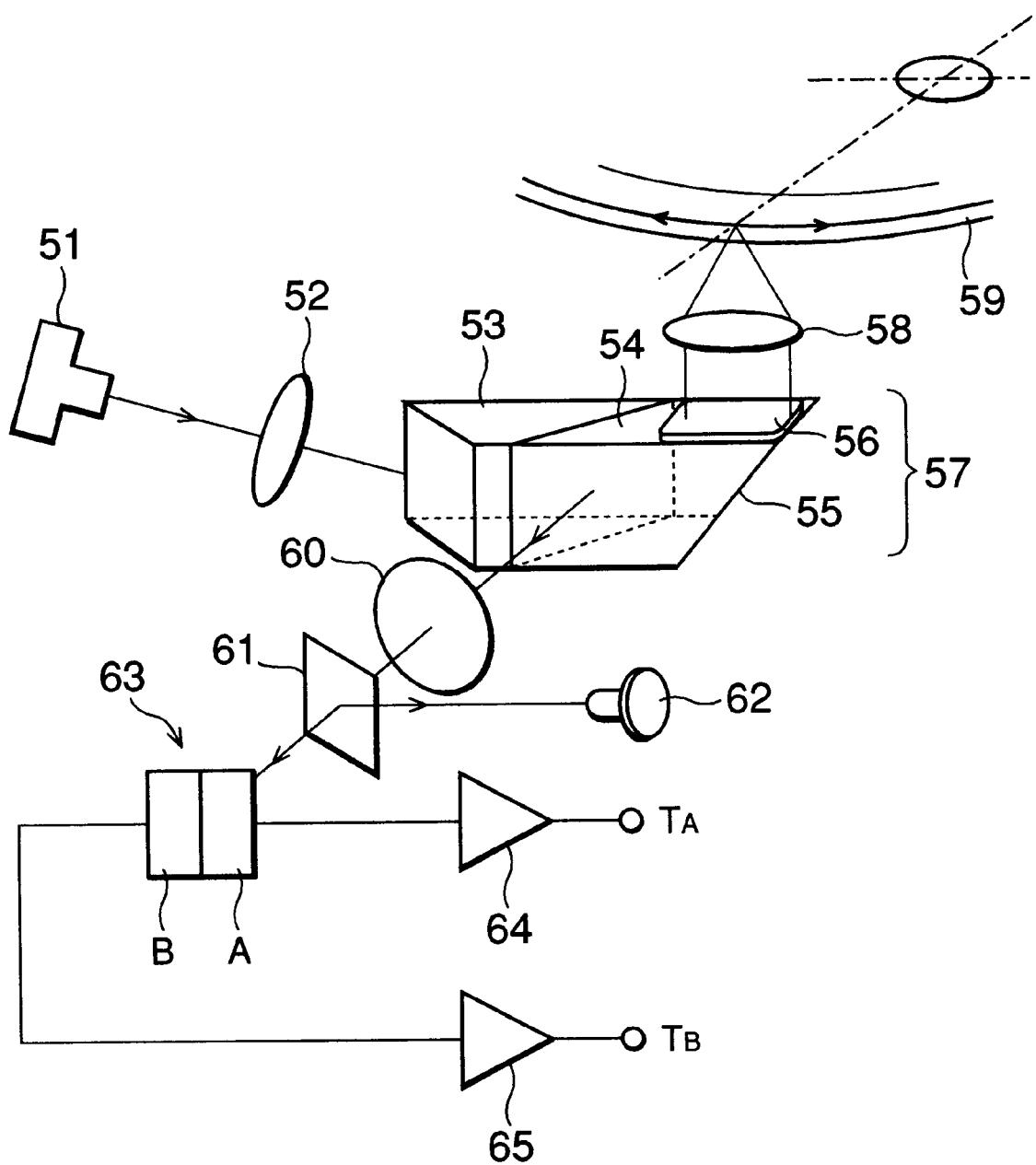
FIG. 7 shows an arrangement of a prior art optical disc apparatus.
Figure 8A:
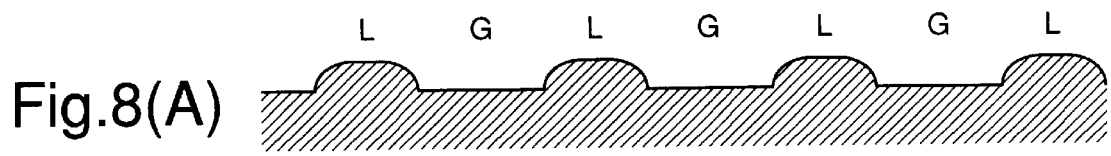
FIGS. 8(A), 8(B), 8(C) and 8(D) show relationships between tracks of land/groove on an optical disc and a light beam spot, for explaining a way of counting tracks on the optical disc according to the prior art shown in FIG. 7.
Figure 8B:
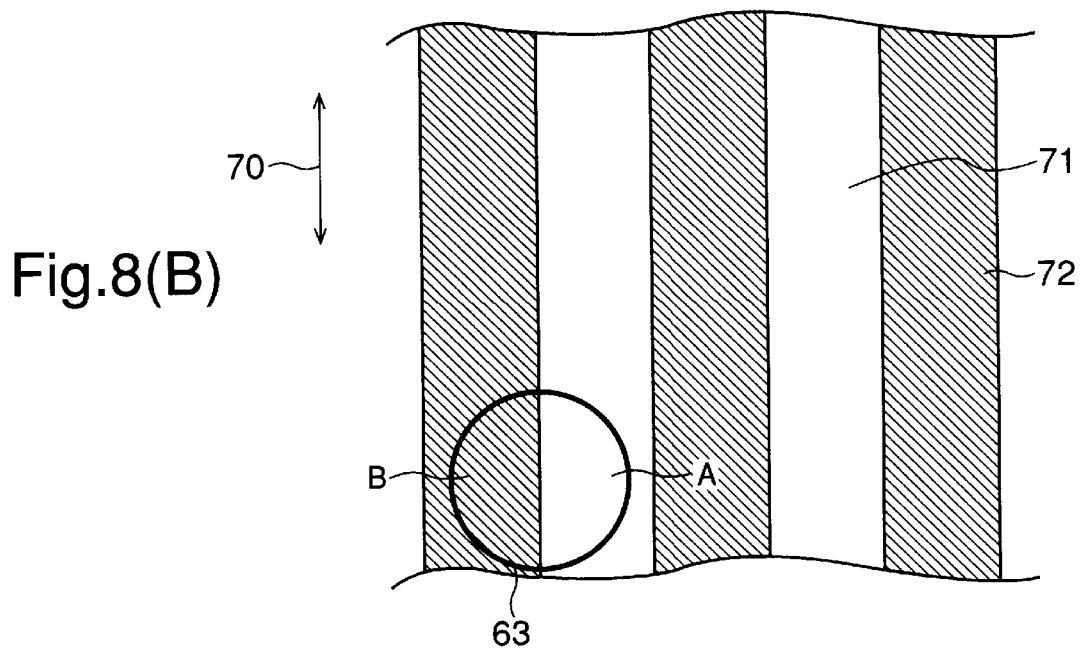
Figure 8C:
Figure 8D:
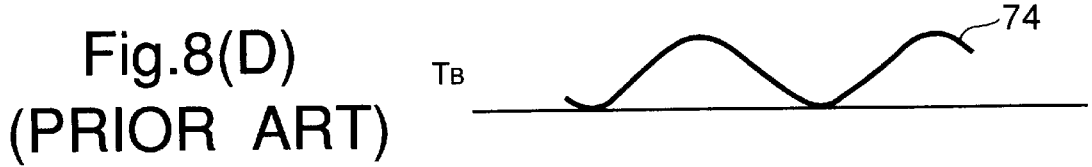

The present invention is not limited to the above specific embodiments. For example, as shown in FIG. 6, the aforementioned four-division optical sensor 23 may be replaced by a six-division optical sensor 46 which is made up of six light sensing elements P1, P2, Q, R1, R2 and S. In FIG. 6, upward- and downward-directed arrows denote the track tangential direction of the optical disc. The six-division optical sensor 46, which has two division lines arranged as tilted by an angle of 45 degrees with respect to the track tangential direction of the optical disc and one division line arranged parallel to the track tangential direction, receives the reflected light from the optical disc through the six sensing elements P1, P2, Q, R1, R2 and S.

In this case, the track count signal TC and the tracking error signal TE satisfy equations which follow.

$$TC = \{(P1+P2), Q\}$$

$$TE = (P2+R2+Q) - (P1+R1+S)$$

More specifically, when the beam spot moves up or down in a direction tangential to the division line arranged parallel to the track tangential direction, the track count signal TC is generated based on a sum signal indicative of a sum of output signals of the two sensing elements P1 and P2 arranged at the upper side and on an output signal of the light receiving part Q. Further, the tracking error signal is a subtraction of an addition signal indicative of an addition of output signals of the sensing elements P1, R1 and S at the right half in the drawing from an addition signal indicative of an addition of output signals of the sensing elements P2, R2 and Q at the left half.

Although explanation has been made in connection with the case where the respective two division lines of the four-division optical sensor 23 in FIG. 1 and six-division optical sensor 46 in FIG. 6 are tilted by an angle of 45 degrees with respect to the track tangential direction, the present invention is not restricted to the specific example, but the present invention can be applied to such a case that the above tilt angle is any angle so long as the angle is within a range of 45±25 degrees.

As has been explained in the foregoing, in accordance with the present invention, the four- or six-division optical sensor is used so that, in the random access mode, the specific sensing elements of the optical disc outputs the photoelectrically-converted output signals which phase difference is other than 180 degrees, e.g., about 90 degrees, and the judgement signal for the movement direction of the beam spot on the optical disc is generated based on the phase difference for track counting. As a result, even when the optical disc having the lands and grooves which widths are nearly equal is randomly accessed by the same optical sensor as the optical sensor which can detect the tracking error signal, the sensor can generate such a signal as to allow easy judgement of the movement direction of the focused beam spot, whereby the optical disc apparatus can perform accurate track counting operation and improve a reliability in random access with a simple arrangement.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An optical disc apparatus which records and reproduces an information signal in and from both lands and grooves on an optical disc, comprising:

a four-division optical sensor for receiving reflected light from said optical disc, said optical sensor segmented by division lines which are positioned as tilted by an angle in a range of 45±25 degrees with respect to a track tangential direction of said optical disc, said optical sensor being made up of first and second light sensing elements positioned parallel to said track tangential direction and third and fourth light sensing elements positioned along a direction perpendicular to said track tangential direction;

tracking error signal generating means for generating a tracking error signal from a difference between photoelectric-converted output signals delivered from said third and fourth light sensing elements;

a signal processing circuit for generating a movement direction judgement signal of a beam spot on the optical disc in a random access mode on the basis of a phase difference between a first photoelectric converted output signal of one of said first and second light sensing elements and a second photoelectric converted output signal of one of said third and fourth light sensing elements; and count means for counting a zero-cross detection signal of said tracking error signal in a count direction based on said movement direction judgement signal.

2. An optical disc apparatus as set forth in claim 1, wherein said signal processing circuit includes a first circuit for generating a first phase difference signal having a pulse width corresponding to a distance between a rising edge of said first photoelectric-converted output signal and a rising edge of said second photoelectric-converted output signal, a second circuit for generating a second phase difference signal having a pulse width corresponding to a distance between the rising edge of said first photoelectric-converted output signal and a falling edge of said second photoelectric-converted output signal, a third circuit for generating a first difference signal corresponding to a subtraction of said first phase difference signal from said first photoelectric-converted output signal, a fourth circuit for generating a second difference signal corresponding to a subtraction of said second phase difference signal from said first photoelectric-converted output signal, and a fifth circuit for generating said movement direction judgement signal on the basis of a phase lead or lag between said first and second difference signals.

3. An optical disc apparatus which records and reproduces an information signal in and from both lands and grooves on an optical disc, comprising:

a four-division optical sensor for receiving reflected light from said optical disc, said optical sensor segmented by division lines which are positioned as tilted by an angle in a range of 45±25 degrees with respect to a track tangential direction of said optical disc, said optical sensor being made up of first and second light sensing elements positioned parallel to said track tangential direction and third and fourth light sensing elements positioned along a direction perpendicular to said track tangential direction;

tracking error signal generating means for generating a tracking error signal from a difference between photoelectric-converted output signals delivered from said third and fourth light sensing elements;

a zero-cross detection circuit for detecting a zero cross in a rising or falling part of said tracking error signal, an addition circuit for generating a sum signal indicative of a sum of both output signals from said first and second light sensing elements, and a sample/hold circuit for sampling and holding the output sum signal of said addition circuit with an output zero-cross detection signal of said zero-cross detection circuit and for outputting said movement direction judgement signal; and count means for counting a zero-cross detection signal of said tracking error signal in a count direction based on said movement direction judgement signal.

4. An optical disc apparatus which records and reproduces an information signal in and from both of lands and grooves on an optical disc, comprising:

a six-division optical sensor made up of six light sensing elements for receiving reflected light from said optical disc through said six light sensing elements, said optical sensor being segmented by two division lines arranged as tilted by an angle in a range of 45±25 degrees with respect to a track tangential direction of said optical disc and one division line arranged parallel to said track tangential direction;

tracking error signal generating means for generating a tracking error signal indicative of a difference between a sum signal of output signals of three light sensing elements and a sum signal of output signals of the other three light sensing elements, each of the three light sensing elements being segmented by said division line arranged parallel to said track tangential direction;

a signal processing circuit for generating a signal for judgement of a movement direction of a beam spot on said optical disc in a random access mode, on the basis of a phase difference between a sum signal of the photoelectric-converted output signals from two light sensing elements arranged at an upper side and a photoelectric converted output signal of one light sensing element adjacent to one of said two light sensing elements; and count means for a zero-cross detection signal of said tracking error signal in a count direction based on said movement direction judgement signal.

* * * * *